United States Patent
Liu et al.

(10) Patent No.: US 8,155,006 B2
(45) Date of Patent: Apr. 10, 2012

(54) METHOD, DEVICE, AND COMMUNICATION SYSTEM FOR ADJUSTING DATA RATES IN A NETWORK

(75) Inventors: Yongjun Liu, Shenzhen (CN); Yongfeng Zhong, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 153 days.

(21) Appl. No.: 12/455,343

(22) Filed: Jun. 1, 2009

(65) Prior Publication Data

US 2009/0240831 A1 Sep. 24, 2009

Related U.S. Application Data

(63) Continuation of application No. PCT/CN2007/071151, filed on Nov. 29, 2007.

(30) Foreign Application Priority Data

Dec. 1, 2006 (CN) .......................... 2006 1 0157244

(51) Int. Cl.
*H04J 3/22* (2006.01)
(52) U.S. Cl. ......... 370/235; 370/465; 370/333; 709/233
(58) Field of Classification Search .................. 709/223
See application file for complete search history.

(56) References Cited

U.S. PATENT DOCUMENTS

| | | | | |
|---|---|---|---|---|
| 5,367,523 A | * | 11/1994 | Chang et al. | 370/235 |
| 2003/0081628 A1 | * | 5/2003 | Sugar et al. | 370/461 |
| 2004/0203834 A1 | * | 10/2004 | Mahany | 455/453 |
| 2005/0105905 A1 | * | 5/2005 | Ovadia et al. | 398/47 |
| 2005/0268181 A1 | | 12/2005 | Murty et al. | |
| 2006/0028987 A1 | * | 2/2006 | Alexander Gildfind et al. | 370/232 |
| 2007/0019591 A1 | | 1/2007 | Chou et al. | |
| 2007/0047508 A1 | * | 3/2007 | Yamada et al. | 370/338 |
| 2007/0127378 A1 | * | 6/2007 | Yang et al. | 370/235 |
| 2010/0103819 A1 | * | 4/2010 | Samuels et al. | 370/235 |

FOREIGN PATENT DOCUMENTS

| | | |
|---|---|---|
| CN | 184605 A | 10/2006 |
| CN | 1852571 A | 10/2006 |
| WO | 03003657 A1 | 1/2003 |
| WO | WO 2006/047726 A2 | 5/2006 |

OTHER PUBLICATIONS

1st Office Action in corresponding Chinese Application No. 200610157244.6 (Feb. 11, 2011).

(Continued)

*Primary Examiner* — Tammy Nguyen
*Assistant Examiner* — Natisha Cox
(74) *Attorney, Agent, or Firm* — Huawei Technologies Co., Ltd.

(57) ABSTRACT

A method for adjusting data rate in a network is disclosed. In the method, when a device is added to the network, a data rate controlling parameter is configured, and when there is a new service or the requirements of a service have been changed, the data rate will be adjusted by modifying the data rate controlling parameter of a source device and/or a transfer device. Therefore, the fairness among these devices would be guaranteed, and the congestion over the network would be mitigated. The present invention also discloses a wireless communication system, a data rate adjusting device, and a topologic server.

17 Claims, 9 Drawing Sheets

OTHER PUBLICATIONS

Written Opinion of the International Searching Authority in corresponding PCT Application No. PCT/CN2007/071151 (Mar. 20, 2008).

"IEEE Std 802.15.4—Part 15.4: Wireless Medium Access Control (MAC) and Physical Layer (PHY) Specifications for Low-Rate Wireless Personal Area Networks (LR-WPANs)," IEEE Standard for Information technology—Telecommunications and information exchange between systems—Local and metropolitan area networks—Specific requirements, Oct. 1, 2003, IEEE Computer Society, New York, New York.

Corresponding granted Chinese Patent No. CN1011928618 (Application No. 200610157244.6 ) citing prior art at Item (56), issued Nov. 11, 2011, 1 page only.

* cited by examiner

METHOD, DEVICE, AND COMMUNICATION SYSTEM FOR ADJUSTING DATA RATES IN A NETWORK

CROSS-REFERENCE TO RELATED APPLICATIONS

This patent application is a continuation of International Patent Application No. PCT/CN2007/071151, filed Nov. 29, 2007, designating the U.S., which claims the priority of Chinese Patent Application No. 200610157244.6, filed Dec. 1, 2006, the contents of which are incorporated in the present application by reference.

FIELD OF THE INVENTION

The present invention relates to the field of communications, and more particularly to a technology for adjusting data rates in a communications network.

BACKGROUND OF THE INVENTION

How to arrange a device to access to channel becomes increasingly important in wireless communications networks. Channel access technology is usually implemented in the Media Access Control (MAC) protocol layer, and can be divided into the following modes: frequency division multiple access, time division multiple access, code division multiple access, and random access, of which random access is a widely employed mode, particularly in ad hoc networks or mesh structured networks, for instance, the currently available wireless Local Area Network (LAN) system, Blue Tooth system and ZigBee system (a low-rate and short-distance wireless technology based on the IEEE 802.15.4 Standard), as it possesses the characteristics of simplicity, easy control and capability for being processed in a distributional way.

In accordance with the mode of random access to channel, the device monitors for a period of time prior to access to channel. If no other devices are found to be transmitting signals, the device transmits a signal or waits for a random period of time to transmit the signal. If another device is found to be transmitting a signal, the device waits for a random period of time and then monitors the channel. Specific algorithms may vary to certain extent, but it is not necessary to control at the higher layer, as each device transmits data in a rate predetermined by itself and competes for the channel in accordance with the MAC protocol entirely.

However, the mode of random access to channel may engender some problems. In the case that the transmit power of the device is given, communication capacity accommodating in a unit area is restricted. For instance, there are many devices in a unit area, and there might be different devices transmitting data in different time, but in normal cases there can be one device transmitting data over each channel at any time. Otherwise, there would be interference due to conflicts. Thus, devices having larger data traffic might occupy the channel for a prolonged period of time, thereby making it difficult for other devices to access or causing the other devices to be considerably delayed, thus making it difficult to guarantee fairness among the devices.

Moreover, the problem of "hidden node" leads to some defects in the mode of random access to channel. One characteristic of wireless communication is the fast attenuation of signals with increasing distance, so that each wireless device has a certain range of communication. As shown in FIG. 1, node B is within the range of communication of node C, whereas node A is outside the range of communication of node C. However, in the case that the network does not employ such hardware measure as a directional antenna, transmission of the signal is not directional, so that when node C transmits data to node D, node B can also receive the data. In accordance with the mode of random access to channel, it is necessary for node A or C to monitor the channel prior to data transmission, and node A or C can transmit data when no other node is transmitting data so as to avoid conflict. But in the circumstance as shown in FIG. 1, since node A is not in the same range of communication as node C, upon monitoring the channel, node A cannot "hear" that node C is transmitting data, and hence node A transmits data to node B, at which time node B cannot properly receive the data due to interference from node C. In other words, signals sent from node A and node C conflict with each other at node B, and node C is called in this case as a "hidden node" of node A. Similarly, node A may also become a hidden node of node C.

Existence of the "hidden node" not only leads to influence by other irrelevant devices to the current device, but also causes interference among several devices on the same communication link. As shown in FIG. 2, the communication link is A->B->C and employs a single communication channel. Data transmission cannot be carried out in the maximum rate of 100% on this link, because when device A transmits data to device B, device B cannot transmit data to device C. Otherwise the transmitter signal of device B would greatly interfere with its own receiver. As a result, the maximum rate is only 50%, that is to say, device A sends data to device B in 50% of the time, and device B sends data to device C in the remaining 50% of the time.

In the case of three-hops, the adverse influence of "hidden node" on the communication rate is more salient than in the case of two-hops as shown in FIG. 2. As shown in FIG. 3, the communication link is A->B->C->D and employs a single communication channel. Under such a circumstance, the rate is at most one third of the maximum rate. When device A transmits data to device B, the transmitter signal of device B interferes with its data reception, and device can hence not transmit the signal, while device C, as a "hidden node" of device A, cannot transmit data to device D either. When device B transmits data to device C, both devices A and C cannot transmit data, this is because transmitter signals of devices B and C interfere with their data reception. That is to say, the data transmitted from device A to device B is interfered, while the signal transmitted from device C to device D interferes with device C itself. Similarly, when device C transmits data to device D, both devices A and B cannot transmit data. Consequently, the entire link is forced to divide into three segments, each of which makes use of at most one third of the time to communicate, so that the rate of the entire link is restricted to be one third of the maximum rate. In cases of more hops, if no hardware measure such as a directional antenna is used, the rate will be restricted to be one third of the maximum rate even under the best conditions.

As mentioned above, existence of the "hidden node" leads to interference among devices and restricts communication rates of the devices. With respect to a device employing random access to channel, communication rate cannot be guaranteed because the occurrence of such interference is unpredictable, so that it is impossible to guarantee service delay to meet the requirements.

SUMMARY OF THE INVENTION

The present invention provides a method, a device and a communications system for adjusting data rate in a network, whereby certain control mechanisms are added to ensure such quality of services as delay criteria of services of devices, and ensure to certain extent the fairness among devices.

An embodiment of the present invention provides a method for adjusting data rate in a network, wherein the method comprises: configuring a data rate controlling parameter in a source device and a transfer device of the network, respectively; and, adjusting a value of the data rate controlling parameter configured in the source device and/or the transfer device to control the data rate, if a new service or requirements of a service have been changed.

An embodiment of the present invention further provides another method for adjusting data rate in a network, wherein the method comprises: configuring a data rate controlling parameter and a data amount threshold in a device; transmitting data in a data rate controlled by the data rate controlling parameter when the data amount of a service is lower than the data amount threshold; and adjusting the data rate by adjusting the data rate controlling parameter value of a source device and/or a transfer device when the data amount of the service is not lower than the data amount threshold.

An embodiment of the present invention further provides a communications system including at least two devices, which include a setting unit adapted to configure a value of a data rate controlling parameter, and an adjusting unit adapted to adjust the data rate controlling parameter value configured by the setting unit to adjust a data rate when the devices serve as source devices or transfer devices.

An embodiment of the present invention further provides another communications system comprising at least two devices and a topologic server, of which the at least two devices include a setting unit adapted to configure a data rate controlling parameter, and an adjusting subunit adapted to adjust the data rate controlling parameter value configured by the setting unit to adjust a data rate in accordance with a notification of the topologic server when the devices serve as source devices or transfer devices, and the topologic server includes a storing unit adapted to store topologic information of the network and data rate controlling parameter value information of each device in the network; a reserving unit adapted to determine, when there is a new service or requirements of a service have been changed, a data rate parameter reservation value in accordance with the stored topologic information and data rate controlling parameter value of each device in the network when the devices serve as sources devices or transfer devices; and a notifying unit adapted to notify the devices serving as the source devices or transfer devices of the reservation value determined by the reserving unit.

An embodiment of the present invention further provides a device for adjusting a data rate, which device includes a setting unit adapted to configure a data rate controlling parameter for a device in a network, and an adjusting unit adapted to adjust the value of the data rate controlling parameter configured by the setting unit to adjust the data rate.

An embodiment of the present invention further provides another device for adjusting a data rate, which device includes a setting unit adapted to configure a data rate controlling parameter for a device in a network, and an adjusting subunit adapted to adjust the value of the data rate controlling parameter configured by the setting unit to adjust the data rate in accordance with a notification of the topologic server.

An embodiment of the present invention further provides a topologic server in a communications network, which server comprises a storing unit adapted to store topologic information of the network and data rate controlling parameter value information of each device in the network; a reserving unit adapted to determine, when there is a new service or requirements of a service have been changed, a reservation value of a source device or a transfer device in the network in accordance with the stored topologic information and data rate controlling parameter value of each device in the network; and a notifying unit adapted to notify the source device or transfer device of the reservation value determined by the reserving unit.

According to the present invention, a data rate controlling parameter is configured for the device in the network, and the value of the data rate controlling parameter is adjusted according to change of requirements of the service, so as to ensure the data rate and satisfy the requirements of delay criteria of the service, ensure to certain extent the fairness among devices, prevent devices from randomly transmitting data and reduce network congestion.

DETAILED DESCRIPTION OF THE INVENTION

To make clearer the objectives, technical solutions and advantages of the present invention, the present invention is described in greater detail below with reference to the accompanying drawings.

The present invention ensures such quality requirements as delay of the service by adding certain control mechanisms. There are usually the following two methods for ensuring quality of services: one is to directly modify the channel access protocol of the MAC layer; another is to modify the control protocol at the higher layer. The first method is relatively difficult and inferior in compatibility, thus damaging the independency of the protocol layer. The second method is relatively easy and better in compatibility. The second method is considered in the embodiments according to the present invention.

Figure 1:
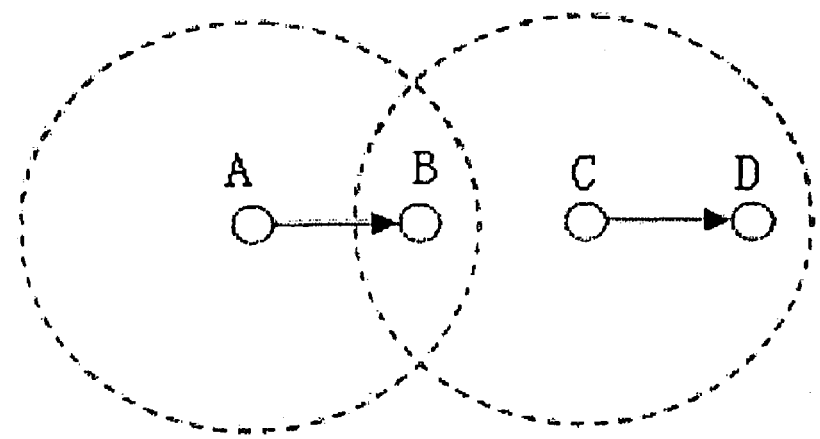
FIG. 1 is a view illustrating the problem of hidden node in the conventional art.
Figure 2:
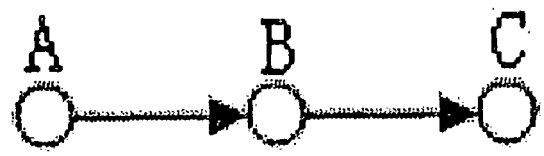
FIG. 2 is a view illustrating two-hops communication in the conventional art.
Figure 3:
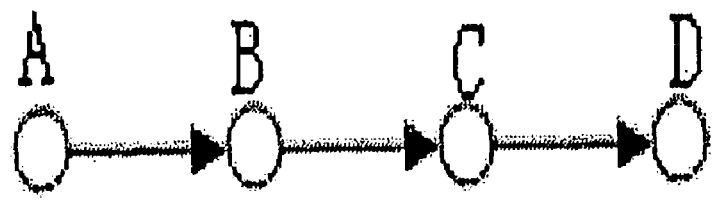
FIG. 3 is a view illustrating three-hops communication in the conventional art.
Figure 4:
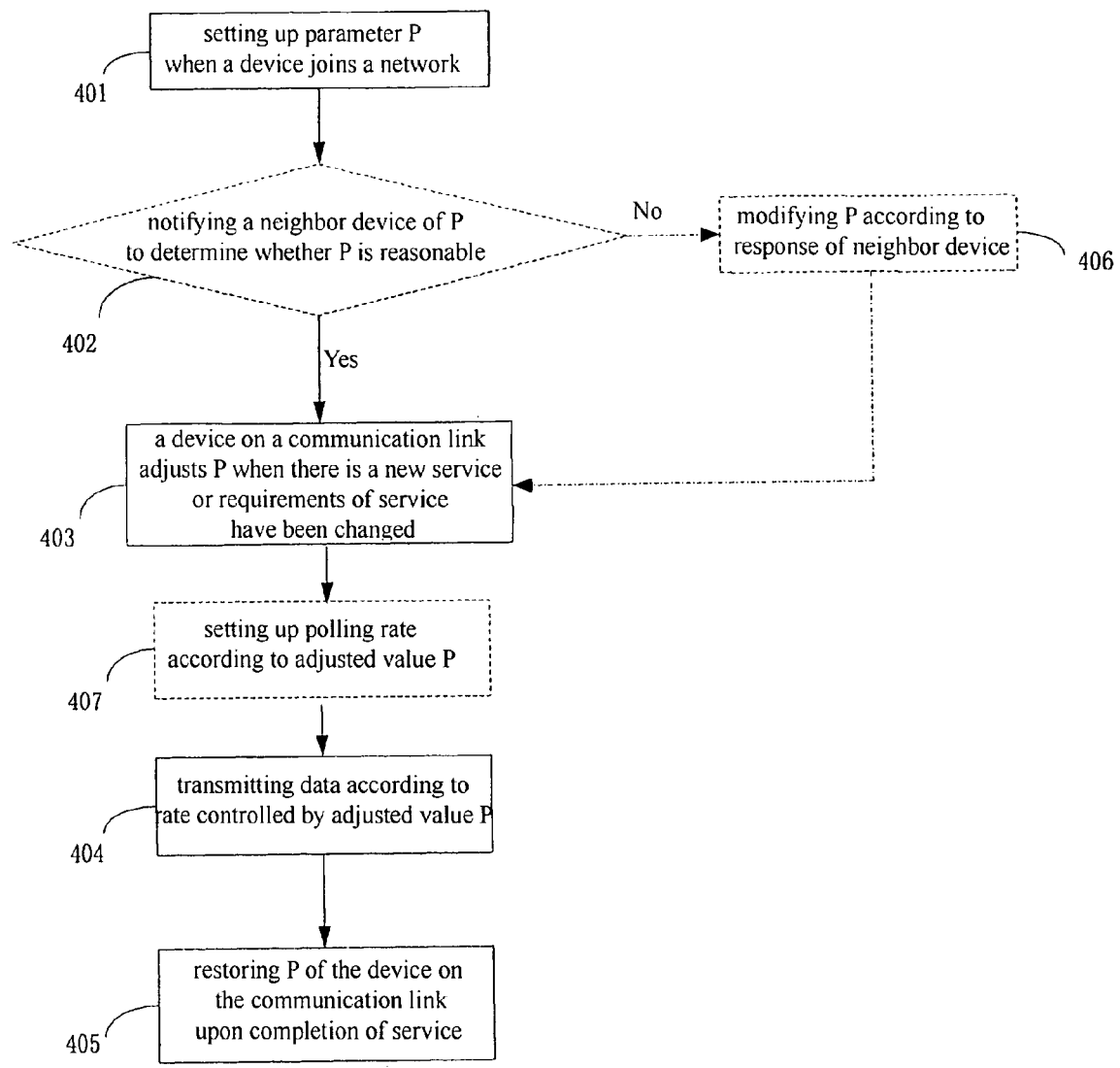
FIG. 4 is a flowchart according to an embodiment of the present invention.

The flow is shown in FIG. 4 and specifically described below.

Step 401: When a device newly joins in the network, a data rate controlling parameter P is configured to ensure such requirements as delay of the service of this device. The parameter P indicates the maximum occupancy rate of the device on channel resources, and is used for controlling the rate in which higher layers (broadly indicating protocol layers above the MAC layer) transmit data. The high layers transmit data not continuously to complete at once, but in segments, and there is a time interval between every two of the segments. It is defined that the total segmentation transmission time divided by the total transmission time (i.e., the total segmentation transmission time added with the total interval time) equals to P or is an expression with P as the exclusive independent variable (such as 2*P). In fact, the data rate controlling parameter is somehow related to the average delay parameter, the maximum delay parameter, the bandwidth requirement parameter, or the segmentation interval parameter during segmented transmission. Specifically, the data rate controlling parameter can be an expression with the average delay parameter, the maximum delay parameter, the bandwidth requirement parameter, or the segmentation interval parameter during segmented transmission as an exclusive independent variable. The following makes specific enunciation taking the relationship between the average delay parameter and the data rate controlling parameter as an example. As can be known from the definition of P, the greater the value P of a device is, the faster the data rate of the service of the device will be, and the less the delay will be.

Sizes of the segments can either be identical with or different from each other, and the time intervals there between can either be identical with or different from each other. The protocol usually prescribes the maximum length of a segment, so that under general circumstances the device transmits data according to the size of the maximum segment insofar as possible. For instance, it is prescribed in the IEEE 802.15.4 protocol that the maximum length of data frames in a physical layer be 127 bytes, while the data rate is 250 kbps, then the time it requires to transmit the maximum segment will be 127*8/250=4 ms. If P is set as equal to 0.4, an interval of 6 ms is then required for transmitting each maximum segment. When the data amount transmitted by a device is so large that it exceeds the size of the maximum segment, the commonly employed method is to carry out segmented transmission according to the length of the maximum segment, so that an interval of 6 ms will be required for each transmission of 4 ms.

When the device newly joins in the network, the value of parameter P can be set as 0 (ignoring resources occupied by signaling transmission), and can also be preset as an initial value prescribed by application criteria. Generally, the application criteria prescribe such performance index parameters as maximum delay, average delay and polling rate, etc., and it is hence possible to also provide the initial value of parameter P in the application criteria. Different application criteria may prescribe different Ps, while a certain device may simultaneously realize multiple applications. Therefore, when the service of the device is changed, the corresponding value P will also be changed.

The application protocol can set the initial value of the parameter P in accordance with the relationship between the parameter P and the average delay. The relationship between the parameter P and the average delay is found out below taking a simple analysis as an example.

Figure 5:
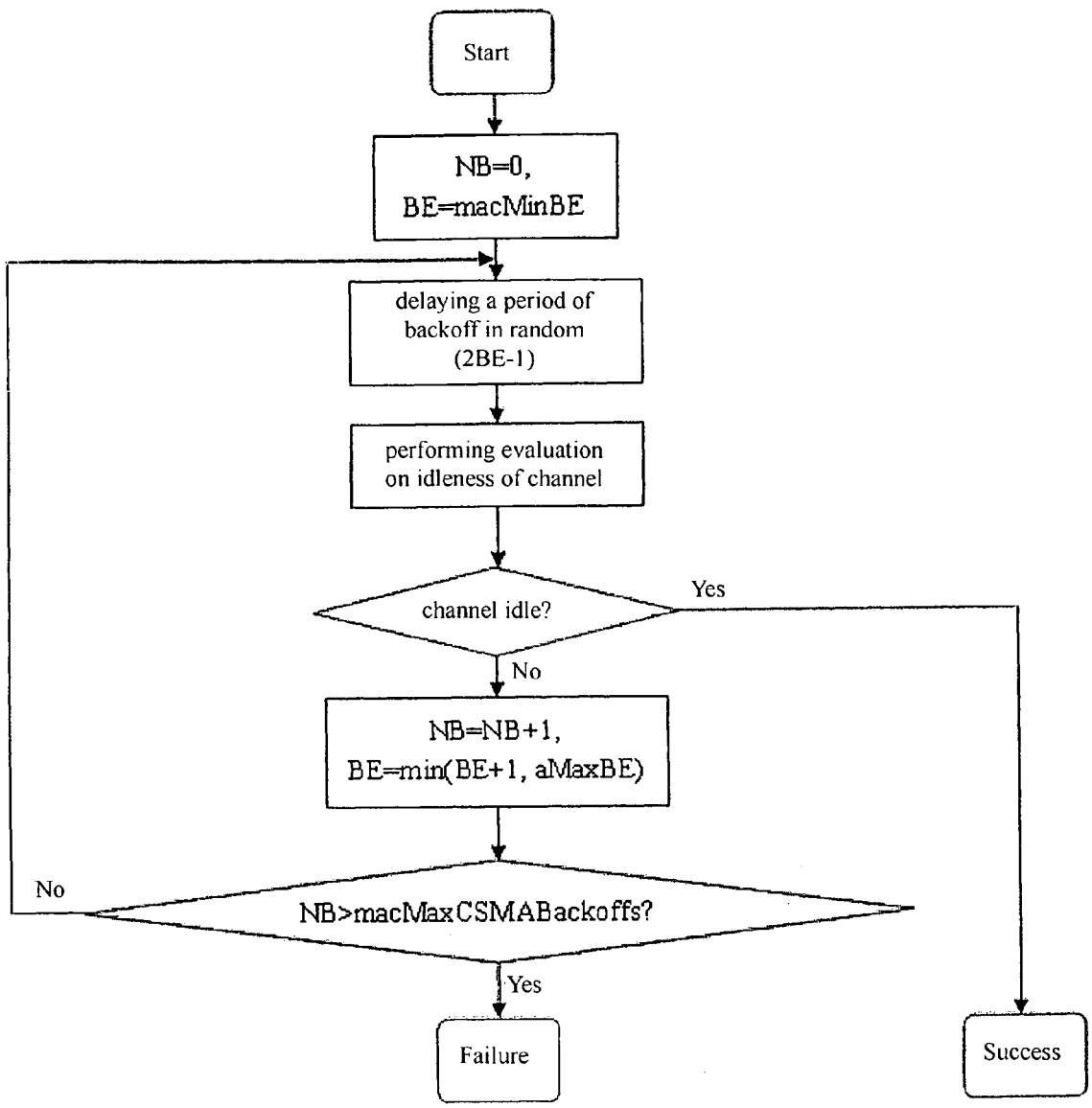
FIG. 5 is a flowchart of the algorithm for random access to channel in the embodiment as shown in FIG. 4.

FIG. 5 is a flowchart of the algorithm for random access to channel. The algorithm employs exponential backoff. NB indicates the total number of backoffs, BE indicates backoff exponents, macMinBE indicates the minimum backoff exponent, aMaxBE indicates the maximum backoff exponent, macMaxCSMABackoffs indicates the prescribed maximum number of backoffs, random(x) indicates random numbers uniformly distributed from 0 to x, and min(x, y) indicates valuation of the minimum value in x and y.

Suppose: MBE=macMinBE, m=mac MaxCSMABackoffs; (MBE+m) is always smaller than aMaxBE, i.e., it is supposed that aMaxBE is greater in value, so that the calculated delay might be lightly greater but this facilitates analysis. If transmission of nodes is unsuccessful, transmission will be continued as long as it is successful. If parameter P of a device N is set as equal to p, nodes at its periphery occupy (1−p) channel resources under the worst situation.

Further suppose that all devices at its periphery transmit data in the maximum rate as agreed upon under the worst situation, since it is not known to device N as when the devices at its periphery transmit data, it can be regarded that the probability for device N to successfully transmit data at any time is p.

Suppose $t_i$=random(0, $2^{MBE+i-1}$), where $t_i$ indicates the time of each backoff, and is a random number uniformly distributed from 0 to $2^{MBE+i-1}$. Further suppose $s_i = t_1 + t_2 + \ldots + t_i$, that is to say, $s_i$ indicates the total of the $i^{th}$ backoff time.

Since backoff should be at the very beginning, the probability of backoff for once is p, the probability of backoff for twice is $(1-p)p$; . . . the probability of backoff for $v^{th}$ is $(1-p)^{v-1}p$.

Although it fails in the backoff algorithm when NB>m, identical data packets will be retransmitted due to the retransmission mechanism of the MAC layer or higher layers, at which time NB returns to zero and the backoff exponents are also restored, so that the top m numbers of backoffs are firstly considered. The average delay in the m numbers of backoffs is i. $T1 = p*s1 + p(1-p)*s2 + p(1-p)^2*s3 + \ldots + p(1-p)^{m-1}sm$ \hfill (1)

ii. The $(m+1)^{th}$ to the $2m^{th}$ backoffs are then considered. Note that the backoff exponents are restored by this time, so that the average delay is iii. $T2 = p(1-p)^m(sm+s1) + p(1-p)^{m+1}$ \hfill (2)
$(sm+s2) + \ldots + p(1-p)^{2m-1}(sm+sm)$
$= (1-p)^m T1 + sm(1-p)^m[1-(1-p)m-1] \ldots$ and so forth, i. $Ti = (1-p)^{(i-1)m} T1 + (i-1)sm(1-p)^{(i-1)m}[1-(1-p)^{m-1}]$ \hfill (2)

ii. Therefore, the total average delay is iii. $T = E(T1+T2+\ldots+T\infty)$

1. $= 1/[1-(1-p)^{m-1}]*p*\{\Sigma_{i=1}^{m}(1-p)^{i-1}*[2^{MBE}(2^i-1) - i]/2\}$ iv. $+[2^{MBE}(2^m-1)-m]*[1-(1-p)^{m-1}]*G/2$ \hfill (4)

where "E" indicates achieving mathematical expectation, G is an infinite series, and, when $|1-p|<1$, converges to $G = \Sigma_{i=1}^{\infty} i(1-p)i*m$ \hfill (5)

The relationship between the parameter P and the average delay can be obtained in Equation (4): the greater the parameter P is set, the less the average delay is.

Figure 6:
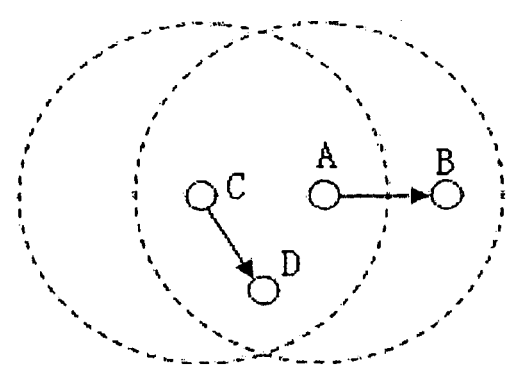
FIG. 6 is a local view illustrating a network in the embodiment as shown in FIG. 4.
Figure 7:
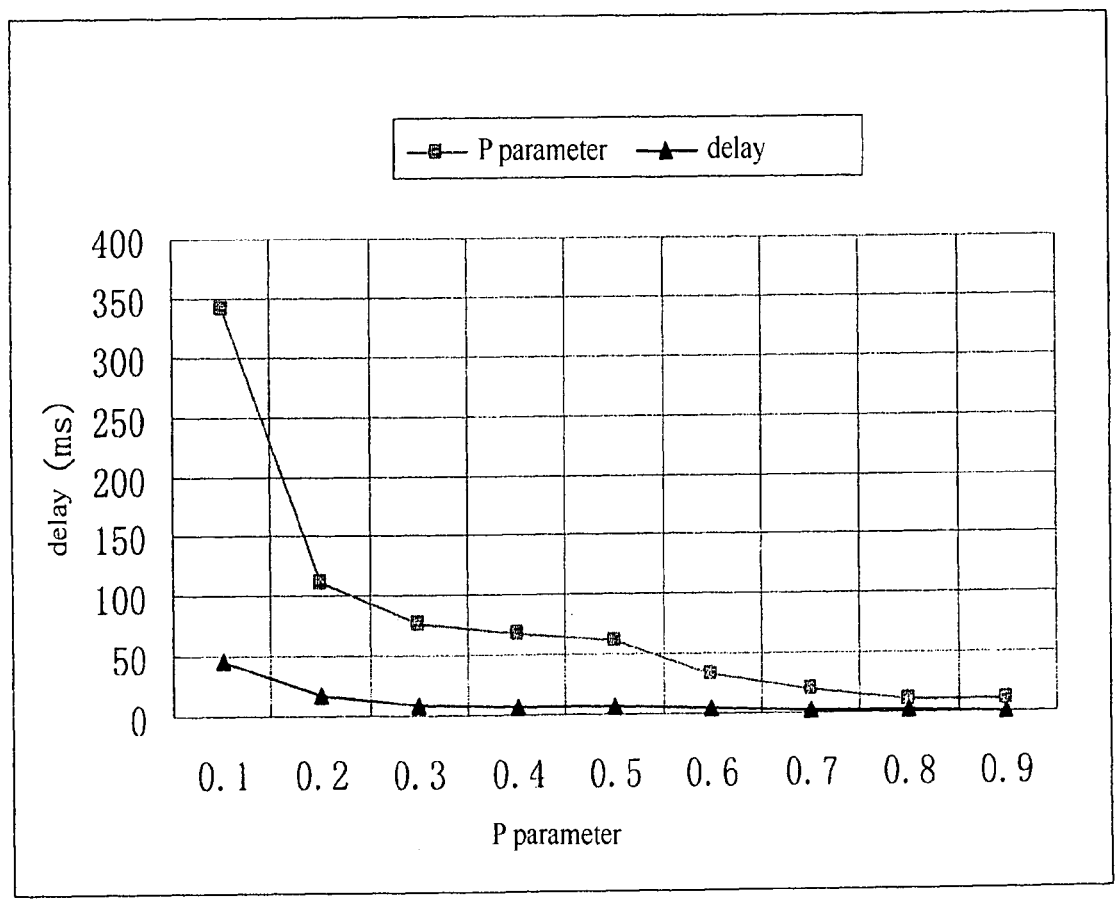
FIG. 7 shows simulation result in the embodiment as shown in FIG. 4.

Explanation is made below with a simple simulation result. Suppose the local situation of a network is as shown in FIG. 6. When device C transmits a great amount of data to device D, and device A is about to transmit a data packet to device B, the data packet transmitted by device A might be delayed due to conflict and backoff of the bottom layer control algorithm, and the delay is related to setting of the data rate, namely P, from device A to device B. Simulation is performed according to the flow of bottom layer algorithm in FIG. 5, and the result thereof is shown in FIG. 7 and illustrated in Table 1, wherein valuations of some parameters are as follows: MBE=3, the default value of macMaxCSMABackoffs is 4, aMaxBE=5, and unit backoff time is 0.32 ms.

TABLE 1

| P | Maximum Delay (ms) | Average Delay (ms) |
|---|---|---|
| 0.1 | 340 | 45 |
| 0.2 | 110 | 17 |
| 0.3 | 76 | 9.7 |
| 0.4 | 69 | 7.2 |
| 0.5 | 62 | 5.5 |
| 0.6 | 32 | 3.4 |
| 0.7 | 19 | 1.8 |
| 0.8 | 12 | 1.2 |
| 0.9 | 12 | 0.59 |

P in FIG. 7 and Table 1 is the parameter P of device A. As can be seen, the greater the value P of device A is, the less the delay from device A to device B is. Accordingly, in order for the delay from device A to device B to meet the requirements of performance, the value P is set to be the greater the better. However, since the parameter P indicates the resource occupancy ratio of the network, setting of the parameter P should take the surrounding devices into consideration. It is generally prescribed that the summation of values P of the surrounding devices should not exceed a certain value, such as "1", which represents the capacity of the network. Accordingly, the current device should negotiate with the surrounding devices, such as device C, for reasonable setting of values P.

The application criteria may also set the initial value of the parameter P in accordance with the relationship between the parameter P and the maximum delay. The maximum delay does not exist in theory, as it exists in the precondition of certain probabilities, for instance, it is neglected in the case the probability is defined as lower than 0.0000001, while it is further prescribed that the maximum delay is 200 ms, so that it suffices for the probabilities of delays that are greater than 200 ms to be lower than 0.0000001. Accordingly, it is necessary to configured two thresholds when it is required to ensure the maximum delay, namely a probability threshold and a delay threshold—the requirement on maximum delay will be satisfied when the probability of exceeding the delay threshold is lower than the probability threshold. Then, the value P to which the maximum delay corresponds can be determined by simulation or theoretical calculation.

Step 402: After setting up the value P, the newly joined device notifies the value P to a neighbor device, and the neighbor device judges whether the value P is reasonable. If it is, the value P is taken as the default value of the newly joined device, and the process proceeds to Step 403. If it is not, Step 406 is performed.

The neighbor device is a device within wireless coverage of the current device and directly communicable with the current device without relay via other devices. In relation to the neighbor device, the current device is called the main device. The neighbor device judges whether setting of the value P of the newly joined device is reasonable in accordance with the value P of a device neighboring to itself. If it is reasonable, the neighbor device sends a response including successful status, and can also not respond, that is to say, no response is acknowledged by default as reasonable, in which case the value P as set is not changed.

Step 406: The neighbor device sends a response including a failure status and a reasonable value P as desired, and the newly joined device modifies its value P in accordance with the information contained in the response of the neighbor device, for instance, by setting P as the minimum value in all reasonable values as desired in the response of failure status. The modified value P is taken as the default value of the newly joined device.

A method of judging whether setting of the value P is reasonable is as follows: summation of values P of the current device and all neighbor devices should not exceed a certain constant, such as 1, because "1" represents 100% of the network capacity. The constant may also not be 1, for instance, in order to reserve certain operating time for other networks operating on the same frequency bands, or to reduce interference with surrounding networks, a user may either set the constant less than 1 or set the constant greater than 1, because the possibility of all neighbor devices simultaneously transmitting data is not likely. Setting of the constant as "1" merely takes the worst situation into consideration, while potential congestion is allowed to certain degree to enhance the total capacity of the network.

Figure 8:
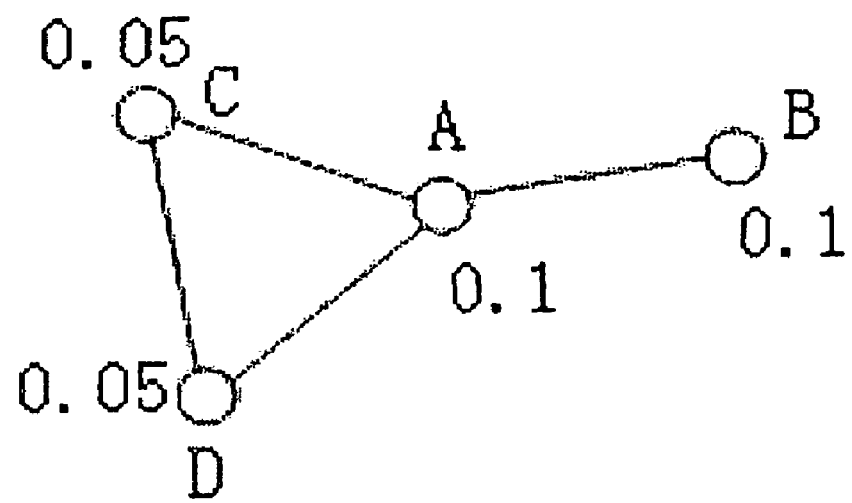
FIG. 8 is a simplified view illustrating the structure of yet another network in the embodiment as shown in FIG. 4.

Taking for example the network as shown in FIG. 8, value P is set as 0.1 when device B newly joins in the network, and the neighbor device A is then notified of the same. It has been known to the neighbor device A that values P of both its own neighbor devices C and D are all 0.05, while its own value P is 0.1, the summation of these plus the value P of the newly joined device B is 0.3 which is less than 1, so that device A transmits a response containing successful status or does not transmit at all. When value P is set as 0.9 when device B newly joins in, the summation of the parameters as calculated by the neighbor device A is 1.1 which is greater than 1, so that device A transmits a response containing a failure status and an expected value 0.8 to device B, and device B modifies its value P to 0.8 upon receiving the response.

As should be explained, not all devices in the network possess the capability to adjust the parameter P. For instance, certain devices have single types of services, are low in data rate and simple in design, and do not possess the capability to adjust the parameter P. If such devices serve as neighbor devices, the values P of such neighbor devices should be estimated in judging whether setting of the value P of the main device is reasonable. A method thereof is to pre-store in the main device a correspondence table between service types and values P, and then to search for the corresponding values P from the correspondence table in accordance with the service types of such neighbor devices. For example, if the device is a wirelessly controlled electrical lamp, it can be supposed that its parameter P is 0.05.

After setting up the value P for the device newly joined to the network, it is also possible not for the neighbor device to verify whether the value is reasonable, because the possibility of network congestion and delay requirement are usually considered while setting the value P for the newly joined device, so that the value is highly likely to be reasonable. Therefore, Step 402 is an optional step whose existence is for better rationality for the setting of the value P.

Figure 10:
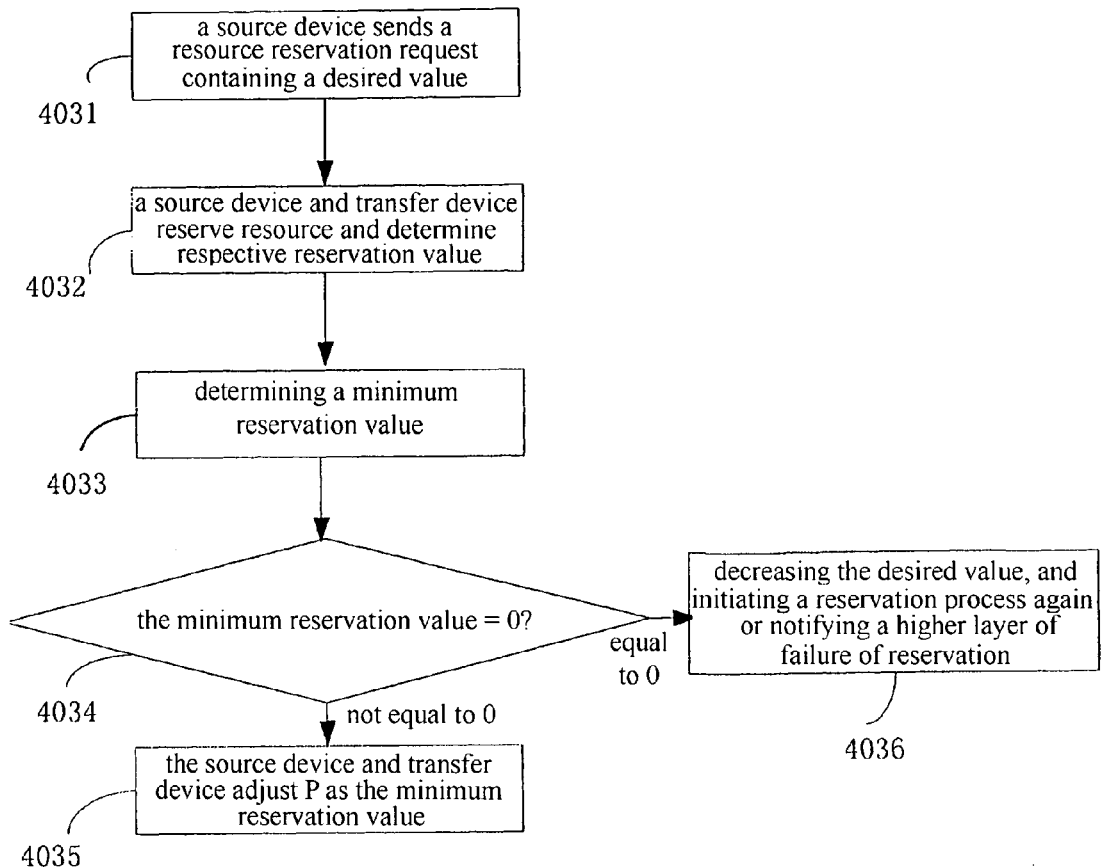
FIG. 10 is a flowchart of adjusting value P in the embodiment as shown in FIG. 4.

Step 403: when there is a new service or requirements of a service have been changed, the devices on a communication link initiate a process of resource reservation, and adjust the values P in accordance with the reservation result. As shown in FIG. 10, the process of resource reservation includes such steps as transmitting a resource reservation request command, judging the reservation status by each device, determining respective data rate parameter reservation value in accordance with the reservation status, determining the minimum reservation value, and notifying each transfer device (namely intermediate forwarding device) by the source device to update the value P as the minimum reservation value. Resource reservation by the source device can be performed prior to, simultaneously with, or after transmitting the resource reservation request. The process of adjusting value P by each device is specifically described below.

Figure 9:
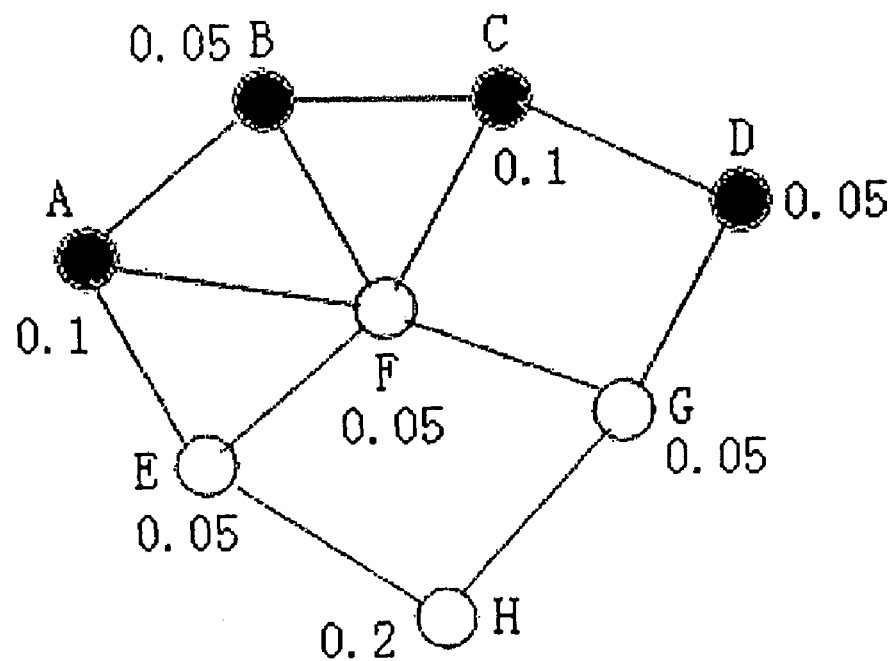
FIG. 9 is a simplified view illustrating the structure of still another network in the embodiment as shown in FIG. 4.

Suppose the network status at the beginning is as shown in FIG. 9, where each device has been configured with a value of parameter P, at which time device A intends to initiate a new service that requires transmitting a great amount of data to device D. In accordance with the delay requirement of the service, the application criteria prescribe the value of parameter P be set as 0.2 at the minimum and as 1 at the maximum. By this time device A finds out that the originally set P equals 0.1<0.2, so that it is necessary to initiate a process of resource reservation to adjust the value P.

In Step 4031, the source device A that initiates the new service transmits a resource reservation request command to service destination device D, and may also transmit the reservation request command to all transfer devices. In this embodiment the reservation request command is transmitted to the destination device. This command includes the address of the source device A, the address of the destination device D, as well as a reserved resource option, namely the value of parameter P desired by device A, or includes the reserved resource option and a minimally required reserved resource option (namely the minimally required value of P). Inclusion of the minimally required value of P in the command is to facilitate subsequent processing, and it may also be possible not to include this value for the same of simplicity. The minimally required value of P is decided by the performance requirement of the service itself. It is prescribed in this embodiment according to the delay requirement of the service that the minimally required value be 0.2. The desired value of parameter P can be selected from the minimally required value 0.2 or the maximum value ⅓, or selected from a default value.

The maximum value of the desired value is related to the number of hops. When the number of hops is N, the maximum value of the desired value can be prescribed as 1/N. In FIG. 9, device A can learn by looking up in a routing table that there are three hops to the destination device D, so that the maximum value of the desired value of P can be set as ⅓. If it is impossible to learn the number of hops from the routing table, it can also be prescribed that the maximum value of P for any not directly arriving data transmission can be set as ⅓, while it is usually possible to learn from the neighbor table or the routing table as to whether data transmission is directly arriving or not.

The desired value of P is set as 0.33 here, and is then included in the resource reservation request command for transmission to device D.

When there is one hop from the source device to the destination device, i.e., when the source device and the destination device are directly connected to each other, the step of transmitting the resource reservation request command can be omitted.

Step 4032: The source device and the transfer device on the communication link perform resource reservation, including: judging whether reservation is successful (that is to say, whether the value of the parameter P as desired by these devices is allowed under the network capacity), and determining a data rate parameter reservation value of P in accordance with the judging result. There are four specific methods thereof, which are specifically described below.

The first method is for each device to loop up the neighbor table to judge whether reservation is successful, i.e., to judge whether a summation of the values P of all devices in the neighbor table plus the value of P desired by itself exceeds a constant S. If the summation does not exceed S, reservation is successful. If the summation exceeds S, reservation is failed. The value of the constant S can be set as "1" indicative of 100% of the network capacity, and can also be set as greater than 1 or less than 1. If reservation is successful, the desired value is taken as a reservation value. If reservation is failed, the reservation value is regarded as 0. Alternatively, in the case the resource reservation request command includes the minimally required value, a lowered reservation value is selected. In other words, a value between the maximally allowable value and the minimally required value is selected as the reservation value. The maximally allowable value means the value P when a summation of values P of neighbor devices is S. If the maximally allowable value is less than the minimally required value, the reservation value is regarded as 0.

The second method is for each device to inquire the neighbor table in real time to judge whether reservation is successful, i.e., to transmit a value P collecting command to the neighbor devices to obtain the latest values P, and then calculate to see whether a summation of the values P exceeds S. If reservation is successful, the desired value is taken as the reservation value. If reservation is failed, the reservation value is regarded as 0. Alternatively, in the case the resource reservation request command includes the minimally required value, a lowered reservation value is selected. In other words, a value between the maximally allowable value and the minimally required value is selected as the reservation value.

The third method is for each device (referred to as main device at this time) to respectively inquire all neighbor devices, and judge whether reservation is successful in accordance with responses from all neighbor devices. In other words, each device transmits, either by one-hop broadcast or by unicast, a reservation inquiry request command to all of its neighbor devices. This command includes the value of parameter P desired by the main device itself, or simultaneously includes the desired value of P and the minimally required value.

Upon receiving the reservation inquiry request command, the neighbor device judges whether reservation is successful, and the method thereof is to search for the neighbor table to see whether a summation of parameters P of all devices therein plus its own value P (if it is a device on a communication link, the value P should be the desired value) exceeds the constant S. If the summation does not exceed S, reservation is successful, and the desired value is taken as the reservation value. If the summation exceeds S, it is responded that reservation is failed. Alternatively, a desired reservation value smaller than the originally desired value is provided in the response, and the main device selects a lowered reservation value in accordance with the response of the neighbor device. Specifically, if the neighbor device selects a value between the maximally allowable value and the minimally required value as the desired reservation value, the main device selects the minimum one from the desired reservation values in the responses of the neighbor devices as the reservation value. If the neighbor device randomly selects a value from all values not exceeding the maximally allowable value as the desired reservation value, the main device selects the minimum one from the desired reservation values in the responses of the neighbor devices as a quasi-reservation value, and judges whether the quasi-reservation value is not lower than the minimally required value. If the quasi-reservation value is not lower than the minimally required value, the quasi-reservation value is taken as the reservation value. If the maximally allowable value is smaller than the minimally required value, the neighbor device sends a response indicative of failed reservation, and may also respond after values P of certain devices have been changed. If one neighbor device responds to the failed reservation, the main device fails with reservation, and the reservation value of the main device is determined as 0.

The fourth method is also for each device to inquire in real time all neighbor devices, and judge whether reservation is successful in accordance with responses of all neighbor devices. That it to say, in judging whether reservation is successful, each neighbor device does not calculate with values of the devices in the neighbor table, but with latest values P obtained by transmitting a value P collecting command to its neighbor devices to calculate whether the summation of values P exceeds S.

If the summation exceeds S, it is responded that reservation is failed. Alternatively, a desired reservation value smaller than the originally desired value is provided in the response. The main device selects a lowered reservation value in accordance with the response of the neighbor device. Specifically, if the neighbor device selects a value between the maximally allowable value and the minimally required value as the desired reservation value, the main device selects the minimum one from the desired reservation values in the responses of the neighbor devices as the reservation value. If the neighbor device randomly selects a value from all values not exceeding the maximally allowable value as the desired reservation value, the main device selects the minimum one from the desired reservation values in the responses of the neighbor devices as a quasi-reservation value, and judges whether the quasi-reservation value is not lower than the minimally required value. If the quasi-reservation value is not lower than the minimally required value, the quasi-reservation value is taken as the reservation value. If the maximally allowable value is smaller than the minimally required value, the neighbor device sends a response indicative of failed reservation. If reservation is failed, the reservation value is regarded as 0. If reservation is successful, the desired value is taken as the reservation value.

Of the aforementioned four methods, the second method and the fourth method are excellent in real-time performance, and the values P finally obtained thereby are more reasonable, but these methods occupy more network resources.

The process of determining the reservation value is explained below taking the network as shown in FIG. 9 as an example. Suppose the value of S is set as 1.

After device A transmits the resource reservation request command, devices B, C and D all receive this command, by which time A, B and C all inquire resource reservation to judge whether reservation is successful. As previously noted, there are four inquiring methods.

The first method is to directly search for the neighbor table. Taking device B for example, its neighbor devices are A, F and C, whose values P are respectively 0.1, 0.05 and 0.1. The summation of these plus the value P desired by device B itself, namely 0.33, is still smaller than 1, so that reservation is successful, and the reservation value of device B is determined as 0.33.

The second method is to inquire in real time the values P of neighbor devices. Still taking device B for example, B transmits a value P collecting command to neighbor devices A, F and C, by which time each device on the communication link feeds back with a desired value, so that the latest values P as obtained are respectively 0.33, 0.05, 0.33. The summation of these plus 0.33 reserved by B for itself exceeds 1, so that reservation is failed, by which time B can feed back the failed reservation and determine the reservation value of P as 0, and can also select a value between the minimally required value 0.2 and the maximally allowable value 0.29 as the reservation value. 0.27 is selected in this case.

The third method is to transmit a resource reservation inquiry command to the neighbor devices, and the neighbor devices inquire the respective neighbor tables upon receiving the command to determine whether reservation is successful. Still taking device B for example, device B transmits a resource reservation inquiry command to all neighbor devices A, F and C, and the command includes the desired reservation value 0.33 and the minimally required value 0.2. Upon receiving the resource reservation inquiry command, the neighbor devices A, B and C respectively inquire their neighbor tables. For instance, A inquires that the values P of the neighbor devices B, E and F are all 0.05, and the summation of these plus its 0.33 and 0.33 of device B is smaller than 1, so that A feeds back a response indicative of successful reservation. While F inquires the neighbor table to find that the values of the neighbor devices are A: 0.33, B: 0.33, C: 0.1 (when F inquires its own neighbor table, it may have already received a reservation inquiry command from C, and P of C in the neighbor table has been changed to 0.33; or may not receive, and value P of C in the neighbor table is still 0.1; it is supposed here that the reservation inquiry command of C is not received), E: 0.05, and G: 0.05, and the summation of these plus its own value of 0.05 is still smaller than 1, so that it is responded that reservation is successful, and C also responds that reservation is successful, so that the reservation value of B is determined as 0.33. As should be explained, when the neighbor device receives the reservation inquiry command, it can either immediately judge whether reservation is successful or delay for a period of time to then perform judgment. Delay is to wait whether there are reservation inquiry commands of other main devices, and the time of delay is usually the delay of the reservation request command after transmission of several hops, such as 3 hops or 4 hops. For instance, after the neighbor device F receives the reservation inquiry command from the main device A, it judges whether reservation is successful after a delay of transmission of 3 hops. In the period of delay, device C also transmits a reservation inquiry command to device B, so that value P of device C has been changed to 0.33 in the neighbor table of device F.

The fourth method is similar to the third method, and differs from the latter in the fact that each neighbor device inquires in real time respective neighbor devices after receiving the resource reservation inquiry command. Taking device A for example, it firstly transmits a resource reservation inquiry command to neighbor devices B, E and F, and each of these neighbor devices transmits a value P collecting command to respective neighbor devices after receiving the command to obtain the latest values P. As for device B, it transmits the value P collecting command to its neighbor devices A, C and F, by which time each device on the communication link feeds back with the desired value, so that the latest values P as obtained are respectively 0.33, 0.33, 0.05, the summation of which plus the value 0.33 of B itself is greater than 1, so that B responds that reservation is failed, or requires to adjust P as a value between the minimally required value 0.2 and the maximally allowable value 0.29. 0.27 is set in this case. As for device E, it transmits the value P collecting command to its neighbor devices A, F and H, and the latest values P as obtained are respectively 0.33, 0.05, 0.2, the summation of which plus the value 0.05 of itself does not exceed 1, so that it responds that reservation is successful. As for device F, it transmits the value P collecting command to its neighbor devices A, B, C, E and G, and the latest values P as obtained are respectively 0.33, 0.33, 0.33, 0.05, 0.05, the summation of which plus the value 0.05 of itself is greater than 1, so that it responds that reservation is failed or provides a lowered desired reservation value. However, when it is found that the requirement cannot be satisfied even if the value is lowered to the minimally required value 0.2, it responds that reservation is failed. Finally, device A deduces that reservation is failed in accordance with the responses of devices B, E and F. Device A can lower the desired value to initiate a reservation request again, or wait for B to initiate the request when F requires B to lower the requirement to 0.2, to again respond to A that reservation is successful, but the reservation value is lowered to 0.2.

Table 2 lists the reservation values of A, B and C finally determined by four methods.

TABLE 2

| Node | Method 1 | Method 2 | Method 3 | Method 4 |
|------|----------|----------|----------|----------|
| A | 0.33 | 0.33 | 0.33/0.2 | 0/0.2 |
| B | 0.33 | 0/0.27 | 0.33/0.2 | 0.33/0.2 |
| C | 0.33 | 0.33 | 0/0.2 | 0.33 |

For a device having no capability to adjust value P, if it serves as a source device, its data rate is relatively stationary. If it serves as a transfer device, its rate depends on the data rate of the source device. If it serves as a neighbor device, it is necessary to estimate the corresponding value P in accordance with the service type of such a neighbor device while judging whether the setting of value P of the main device is reasonable.

The network as shown in FIG. 9 is still taken for example, and it is supposed that device B does not possess capability for adjusting P. Therefore, when there is a new service or requirements of a service have been changed in source device A, it is unnecessary for device B serving as a transfer device to perform resource reservation. In using the aforementioned four methods to judge whether reservation of device A is successful, value P of device B is estimated as 0.05 according to its type, and resource reservation is judged with this value.

Step 4033: The minimum reservation value is determined. One method is for the destination device to transmit a resource reservation response command to the source device, and it is also possible for the last transfer device on the communication link to transmit the resource reservation response to the source device. The resource reservation response command includes a minimum reservation value field, whose initial value is S. Whenever passing through an intermediate device, the current device compares its reservation value with the value in the minimum reservation value field. If it is smaller than the value in the minimum reservation value field, the value in the minimum reservation value field is changed to the reservation value. The value in the minimum reservation value field after all transfer devices and source devices having completed the comparison is the minimum reservation value. Another method is for a transfer device to report its own reservation value to the source device via a resource reservation response, and the source device selects the minimum value from the reservation value responded by the transfer device and its own reservation value as the minimum reservation value.

The network as shown in FIG. 9 is still taken for example. Upon receiving the resource reservation request command, the destination device D transmits a resource reservation response including the minimum reservation field to the source device A to sequentially pass through devices C, B and A. Method 2 in Table 2 is taken for example to obtain the reservation value (B is set as 0.27). The initial value of the minimum reservation value field is 1. When it passes through device C, C compares the parameter P reservation value 0.33 requested by itself with the initial value 1 of the minimum reservation value field as smaller than 1, so that the minimum reservation value is replaced with 0.33. It then arrives at device B, whose reservation value 0.27 is smaller than 0.33, so that the minimum reservation value field is replaced with 0.27. It subsequently arrives at device A, whose reservation value 0.33 is greater than 0.27, so that the value of the minimum reservation value field remains invariant as 0.27. 0.27 is the minimum reservation value.

Step 4034: It is judged whether the minimum reservation value is 0. If it is not 0, Step 4035 is performed. If the minimum reservation value is 0, reservation is failed, and Step 4036 is performed.

Step 4035: The source device and the transfer device adjust their values P as the minimum reservation value. Specifically, the source device adjusts its value P as the minimum reservation value, and transmits to the destination device a reservation notification command containing minimum reservation value message. When the destination device is not a device capable of being dormant, there is no need to configure polling rate, so that the source device can notify all transfer devices only of the minimum reservation value. The source device can adjust its value P after, before, or at the same time of transmitting the reservation notification command.

Upon receiving the reservation notification command, the transfer device passed by updates its parameter P as the minimum reservation value. After update of their values P, the source device and the transfer device can either notify, or not notify, their respective neighbor devices of the parameter update circumstances.

As should be explained, when there is one hop from the source device to the destination device, that is to say, the source device and the destination device can directly communicate with each other, it is possible not to transmit the resource reservation response command, not to determine the minimum reservation value, and also not to transmit the reservation notification command, as it suffices to directly take the data rate parameter reservation value of the source device as the adjusted value P.

Step 4036: If the source device finds that reservation is failed, it can lower the desired value to initiate the reservation process again, or notify higher layers of the failed reservation.

If the destination device or the transfer device is a device capable of being dormant and employs a periodically inquiring mechanism to receive data, Step 407 can be attached to Step 403: to configure a proper polling rate in accordance with the adjusted parameter P.

If the receiving device is a device capable of being dormant, the transmitting device will not know when it will "wake up", so that it is not known when it is suitable to transmit data. Consequently, it is possible to receive data by using the mode of periodically inquiring at the receiving part. That is to say, the device capable of being dormant as the receiving device inquires whether there is data transmitted to it at each period of time, and if there is, the transmitting device transmits the data to the device capable of being dormant. The polling rate/period of the device capable of being dormant will not directly affect the total data rate, but affects delay relatively severely, so that a reasonable polling rate/period should be configured according to the parameter P. Suppose device D as shown in FIG. 9 is a device capable of being dormant, whose adjusted value P is 0.27, and further suppose a delay corresponding to the value P of 0.27 is 70 ms, then the inquiry period of B may be set as lower than 70 ms, or the operating mode should be changed to non-periodical inquiry.

Step 404: Device A transmits data in a data rate controlled by the adjusted parameter P. The transfer device forwards data in a data rate controlled by the adjusted parameter P. If there is a device capable of being dormant in the transfer device or the destination device, the device capable of being dormant receives data in a preset polling rate.

As should be explained, the process of resource reservation increases some overheads for the network. In order to balance the overhead and acquire advantages, it is possible to configure a data amount threshold in accordance with the network overheads increased by resource reservation to judge whether the data amount of the new service is lower than the data amount threshold before initiation of the resource reservation process. If the data amount is lower than the data amount threshold, the value P is not adjusted, instead, data is directly transmitted in a rate controlled a default value P (namely the value P as configured in Step 401, or the modified value P in Step 406). Alternatively, a simpler reserving method, such as the method of inquiring a neighbor table, is employed in judging whether reservation is successful.

Step 405: When data has been transmitted, namely when service finishes, the parameters P of the source device and the transfer device are restored in their original values, namely the default values. The restoring information can either be notified or not notified to the neighbor devices.

Figure 11:
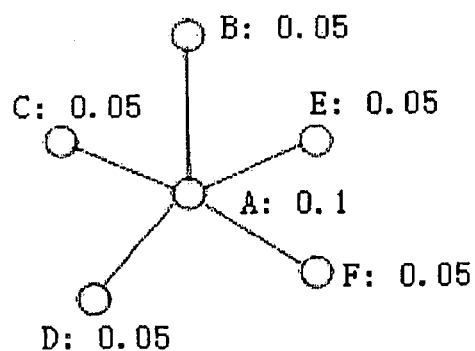
FIG. 11 is a simplified view illustrating the structure of a star network according to another embodiment of the present invention.

In another embodiment of the present invention, the network is a star network, as shown in FIG. 11.

Suppose, in the star network as shown in FIG. 11, there is device A at the beginning, and then new devices join in, each of which is directly connected to device A. The value P of each newly joined device is set as the default value 0.05, and device A is notified of the same, so that device A also sets its value P as the default value 0.1

At certain timing, there is a new service in device F, and the destination device is device A. It is necessary to raise the value P to 0.3, or 0.2 at least. That is to say, the desired value is 0.3 and the minimally required value is 0.2.

Device F learns that device A is directly connected thereto, i.e., there is one hop there between, by inquiring a routing table or other methods. Device F directly performs resource reservation and judges whether reservation is successful. Device F may employ one of the four methods as described in Step 4032 to judge whether reservation is successful, and determines the reservation value. The first method is taken here for example. Device F inquires its own neighbor table in which the neighbor device is device A, whose value P is 0.1. Summation of 0.1 with the desired value 0.3 of device F does not exceed 1 (S is set as equal to 1), reservation is successful, and the reservation value of device F is hence 0.3.

Device F adjusts value P as 0.3, and transmits data in a data rate controlled by the adjusted parameter P=0.3. When service finishes, parameter P of the source device F is restored to the default value 0.05, and the restoring information can either be notified, or not notified, to the neighbor device.

Figure 13A:
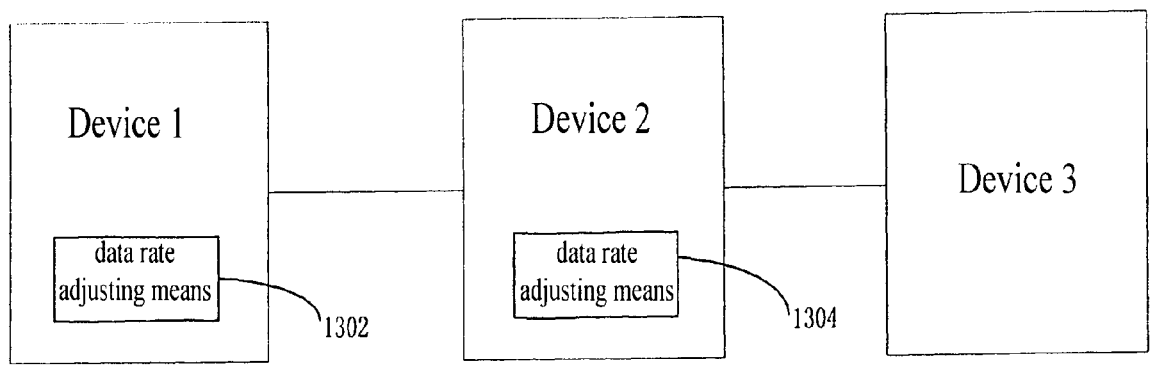
FIGS. 13a and 13b are simplified views illustrating structures of devices according to embodiments of the present invention.
Figure 13B:
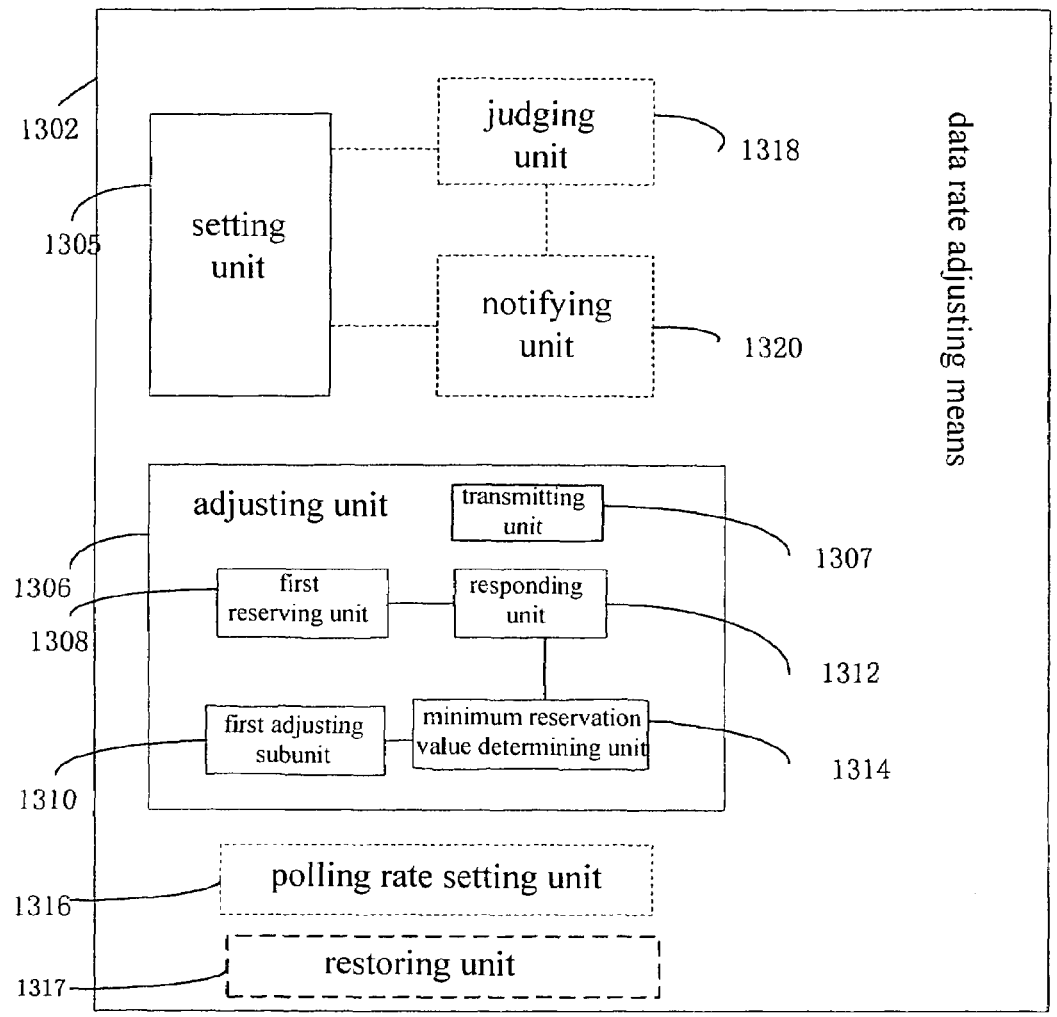

FIGS. 13a and 13b are structural views of the devices according to the embodiments of the present invention. As shown in FIG. 13a, in a wireless network comprising device 1, device 2 and device 3, device 1 is provided with a data rate adjusting means 1302, and device 2 is provided with a data rate adjusting means 1304. As shown in FIG. 13b, the data rate adjusting means 1304 specifically includes a setting unit 1305 and an adjusting unit 1306, and may also include a judging unit 1318 and a notifying unit 1320, and may further include a polling rate setting unit 1316 and a restoring unit 1317, wherein the adjusting unit 1306 specifically includes a first reserving unit 1308, a responding unit 1312, a minimum reservation value determining unit 1314 and a first adjusting subunit 1310. The adjusting unit 1306 may also include a second reserving unit and a second adjusting subunit to adapt to the circumstance of one hop (not shown in the figure). The data rate adjusting means 1302 includes the same units (not shown in the figure) as those included in the data rate adjusting means 1304.

As should be explained, if the data rate adjusting means is applied in a source device, it may not include the responding unit, and if it is applied in a transfer unit, it may not include the minimum reservation value determining unit.

Suppose there were originally device 2 and device 3 in the network as shown in FIG. 13a. When device 1 newly joins in the network, the setting unit 1305 sets up a data rate controlling parameter P to ensure such requirements as service delay of the device.

Optionally, after setting up of the parameter P, device 1 serving as a main device notifies device 2 serving as a neighbor device of the parameter P. The judging unit 1318 of device 2 judges whether parameter P configured by the setting unit 1305 of the newly joined device 1 serving as the main device is reasonable, and the specific method thereof has been previously explained in the method embodiments. If the parameter P is judged to be unreasonable, the notifying unit 1320 of device 2 notifies the setting unit 1305 of device 1 to modify the value of parameter P.

When a new service transmitted from device 1 to device 3 or requirement of a service from device 1 to device 3 has been changed, the adjusting units in device 1 serving as a source device and device 2 serving as a transfer device adjust the values P in accordance with the data rate parameter values of the neighbor devices to satisfy the new requirement on data rate.

Taking device 2 for example to explain the specific process as follows: a transmitting unit 1307 in the adjusting unit 1306 of device 1 transmits a resource reservation request containing a desired value of P to device 3 serving as a destination device via device 2. Upon receiving the request, the first reserving unit 1308 in device 2 performs resource reservation in accordance with the data rate parameter value of the neighbor device of device 1 to determine the data rate parameter reservation value of device 2. During this period of time, device 1 has also determined the data rate parameter reservation value via its first reserving unit 1308. Device 1 can start with resource reservation before, simultaneously with, or after transmitting the reservation request. After determining the data rate parameter reservation value, device 2 notifies device 1 of the data rate parameter reservation value through the responding unit 1312. The minimum reservation value determining unit 1314 of device 1 selects the minimum one from its own reservation value and the reservation value of device 2 as the minimum reservation value. Device 1 notifies device 2 of the determined minimum reservation value, and device 2 on receiving the same adjusts its value P as the minimum reservation value through the first adjusting subunit 1310.

If there is one hop from the source device to the destination device to necessitate adjustment of the value P, resource reservation is directly carried out by the second reserving unit of the source device to determine the data rate parameter reservation value, and the second adjusting subunit of the source device thereafter adjusts the value P as the data rate parameter reservation value.

If device 2 or device 3 is a device capable of being dormant, it is further required to configure a polling rate. It is supposed in this embodiment that device 2 is a device capable of being dormant, and a polling rate setting unit 1316 in device 2 sets up the polling rate in accordance with the adjusted value P.

Device 1 transmits data in a data rate controlled by the adjusted parameter P, while device 2 forwards data in a data rate controlled by the adjusted parameter P and receives data in the polling rate as set. After data transmission, the restoring unit 1317 in device 2 restores the parameter P as the default value, namely the value P as originally configured by the setting unit 1305 or the modified value P.

The methods and devices for adjusting data rate as described in the foregoing embodiments are all based on the distributed controlled mode, but it is possible to replace the distributed controlled mode with centrally controlled mode when the network is relatively small in scale. Embodiments are enunciated below concerning methods and devices for adjusting data rate based on the centrally controlled mode.

A topologic controller is configure in the network to store topologic information of the network and the value of parameter P (notified by each device newly joining in the network) of each device in the network. When it is necessary for the device to modify the value P due to a new service or change of requirement of a service, it transmits the resource reservation request to the topologic controller rather than to the destination device. After receiving the reservation request, the topologic controller calculates the request in combination with topology, and then returns to the requesting source device and the transfer device on the communication link the successful reservation, or value P to be modified or has been modified, or the reservation is failed, and it is also probable for the topologic controller to transmit a polling rate setting command to a device capable of being dormant serving as the transfer device or the destination device. Thereafter, the source device transmits data according to the value of parameter P as set, the intermediate device forwards data according to the value of parameter P as set, and the device capable of being dormant receives data according to the polling rate as set. Specific operation of the centrally controlled mode is explained below taking the network as shown in FIG. 12 for example.

Figure 12:
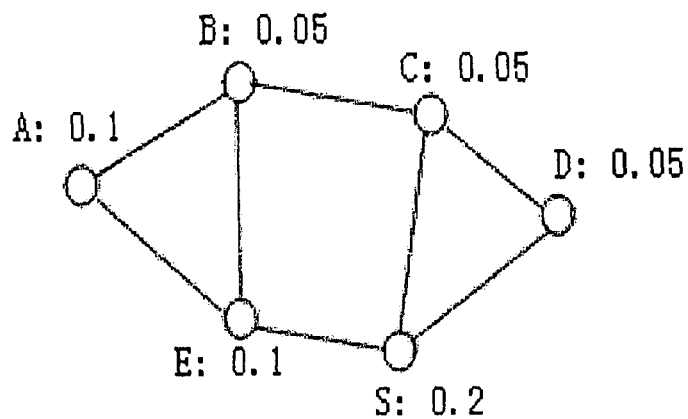
FIG. 12 is a simplified view illustrating the structure of a network according to yet another embodiment of the present invention.
Figure 14:
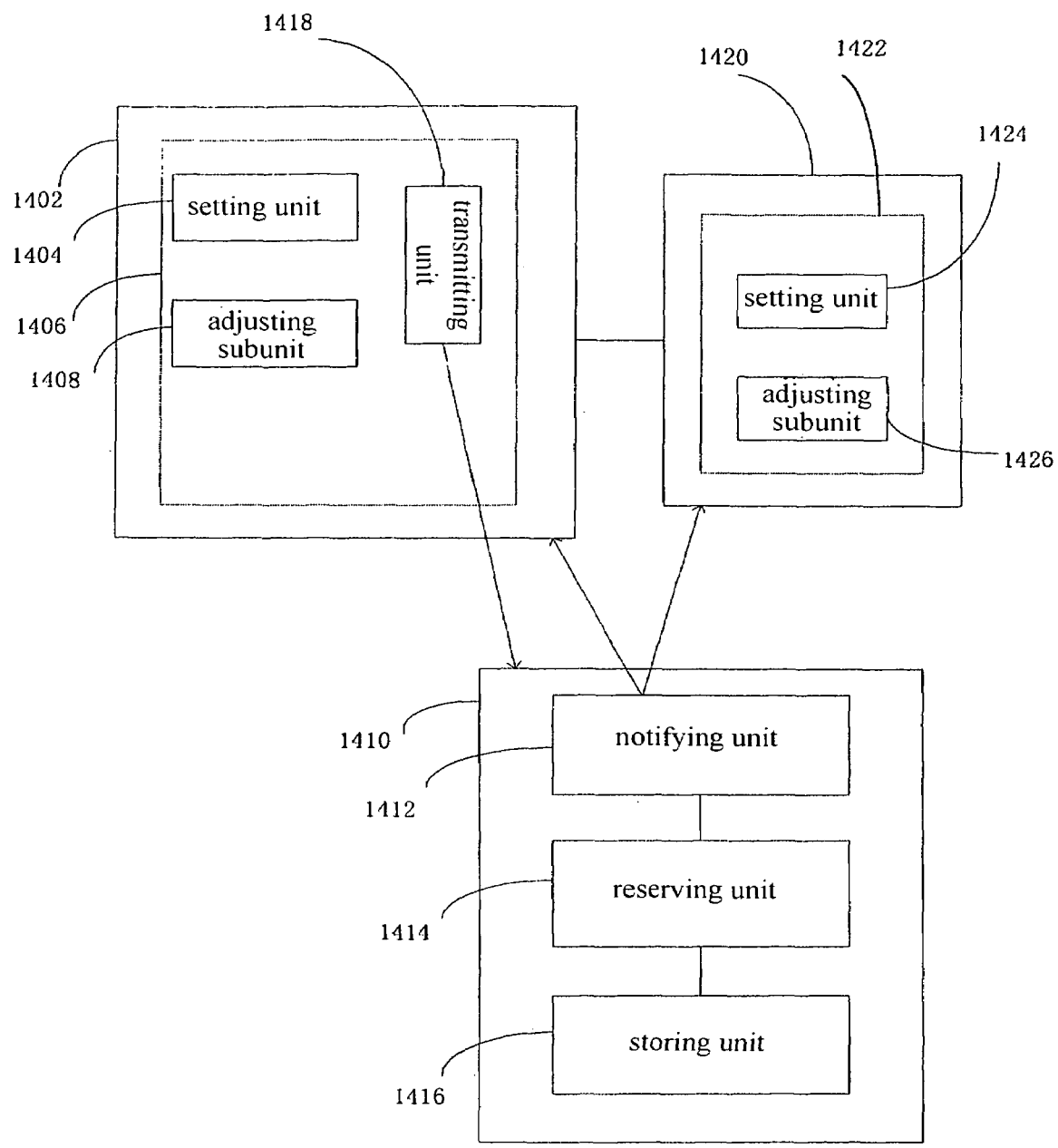
FIG. 14 is a simplified view illustrating structures of a part of devices in FIG. 12.

FIG. 14 is a simplified view illustrating structures of a part of devices in FIG. 12. The topologic server 1410 is the S in FIG. 12, and includes a notifying unit 1412, a reserving unit 1414 and a storing unit 1416. Device 1402 is device A in FIG. 12, and is provided with a data rate adjusting means 1406 which specifically includes a transmitting unit 1418, a setting unit 1404 and an adjusting subunit 1408. Device 1420 is device B in FIG. 12, and is provided with a data rate adjusting means 1422 which specifically includes a setting unit 1424 and an adjusting subunit 1426.

As shown in FIGS. 12 and 14, the storing unit 1416 in the topologic server 1410 stores topologic information of the network, and values P information of devices A, B, C, D and E. When device A is to transmit data to device D, the desired value of P is 0.33 and the minimally required value is 0.2. Accordingly, the transmitting unit 1418 in device A transmits the resource reservation request to the topologic server 1410, and the topologic server 1410 on receiving the request learns via the stored topologic information that devices B and C have to be passed through from device A to device D, and learns via the stored topologic information as to which devices are the neighbor devices of devices A, B and C respectively. Consequently, the reserving unit 1414 in the topologic server 1410 calculates whether summations of the values P of devices A, B and C with the values P of their neighbor devices, respectively, (devices on the communication link participate in the calculation with their desired values) each exceed a predetermined constant, which is supposed as 1. The values P of the neighbor devices A, C and E of device B are respectively 0.33, 0.33, 0.1, the summation of which plus 0.33 of device B exceeds 1, so that the reserving unit 1414 lowers the desired value of A for one step length 0.03 to become 0.3, and resumes calculation. The calculating process is similar to those of the foregoing embodiments, and is hence not repetitively explained here.

It is found upon calculation that none of devices A, B and C exceeds 1, so that the reserving unit 1414 determines the reservation values of devices A, B and C all as 0.3. After the reservation values have been determined, the notifying unit 1412 in the topologic server 1410 respectively notifies devices A, B and C of the reservation values being 0.3 (device C is not shown in the figure). Upon receiving the notification, the adjusting subunit 1408 in device A adjusts the value P of device A as 0.3. If there is a device capable of being dormant in devices B, C and D, the topologic server 1410 sets up a polling rate for the device capable of being dormant in accordance with the value P of 0.3, and notifies the setting result to the device capable of being dormant. Thereafter, device A transmits data in a data rate controlled by P=0.3, devices B and C forward data in a data rate controlled by P=0.3, and the device capable of being dormant receives data in the polling rate as set.

The accompanying drawings and the relevant illustrations thereof are merely aimed to explain the principles of the present invention, rather than used to restrict the protection scope of the present invention. For instance, the present invention is also applicable to a wired communications network. All modifications, equivalent replacements and improvements made within the spirits and principles of the present invention shall be covered by the protection scope of the present invention.

What is claimed is:

1. A method for adjusting a data rate in a communication network, comprising:
    determining, by a source device, a first value of a first data rate parameter of the source device according to a first value of a second data rate parameter of at least one neighboring device of the source device;
    sending, by the source device, a first resource reservation request to a destination device through a transfer device, enabling the transfer device to determine a first value of the first data rate parameter of the transfer device according to a first value of the second data rate parameter of at least one neighboring device of the transfer device;
    receiving, by the source device, a message sent from the destination device through the transfer device after the first resource reservation request being received by the destination device, wherein the message comprises a first minimum value which is a smaller one of the first value of the first data rate parameter of the transfer device and a initial value of the first data rate parameter of the destination device;
    determining, by the source device, a second minimum value which is a smaller one of the first value of the first data rate parameter of the source device and the first minimum value; and setting, by the source device, the first data rate parameter of the source device according to the second minimum value, so as to control a data rate of the source device.

2. The method according to claim 1, wherein
the first resource reservation request comprises a desired value of the first data rate parameter determined by the source device; and
wherein the transfer device determining the first value of the first data rate parameter of the transfer device comprises:
inquiring, by the transfer device, the first value of the second data rate parameter of the at least one neighboring device of the transfer device from a stored neighbor table or in real time from the at least one neighboring device of the transfer device; and
judging, by the transfer device, whether a reservation according to the resource reservation request is successful according to the inquired first value of the second data rate parameter of the at least one neighboring device of the transfer device and the desired value of the first data rate parameter,
wherein, if the reservation is successful, the desired value of the first data rate parameter is taken as the first value of the first data rate parameter of the transfer device.

3. The method according to claim 1, wherein the destination device or the transfer device is capable of being dormant, and the method further comprises:
setting up, by the destination device or the transfer device, a proper polling rate according to the first data rate parameter of the source device set by the source device.

4. The method according to claim 1, wherein the first or the second data rate parameter of each of the source, transfer and destination device comprises:
a total segmentation transmission time divided by a total transmission time; or
an expression with an average delay parameter, a maximum delay parameter, a bandwidth requirement parameter, or a segmentation interval parameter as an exclusive independent variable.

5. The method according to claim 1, further comprising:
after data has been transmitted from the source device, restoring, by the source device, the first data rate parameter of the source device to a value prior to the setting of the first data rate parameter of the source device.

6. A communications system comprising a source device in communication with a destination device through a transfer device, wherein the source device is configured to:
determine a first value of a first data rate parameter of the source device according to a first value of a second data rate parameter of at least one neighboring device of the source device;
send a first resource reservation request to the destination device through the transfer device,
receive a message sent from the destination device through the transfer device, wherein the message comprises a first minimum value;
determine a second minimum value which is a smaller one of the first value of the first data rate parameter of the source device and the first minimum value; and
set the first data rate parameter of the source device according to the second minimum value, so as to control a data rate of the source device;
wherein the transfer device is configured to:
determine a first value of the first data rate parameter of the transfer device according to a first value of the second data rate parameter of at least one neighboring device of the transfer device upon reception of the first reservation request;
and wherein the destination device is configured to:
send a message to the source device through the transfer device after the first resource reservation request is received, wherein the message comprises the first minimum value which is a smaller one of the first value of the first data rate parameter of the transfer device and a initial value of the first data rate parameter of the destination device.

7. The method according to claim 2, wherein the judging whether the reservation is successful comprises:
judging whether a summation of the inquired first value of the second data rate parameter of the at least one neighboring device of the transfer device and the desired value of the first data rate parameter is greater than a preset constant, and wherein if the summation is not greater than the preset constant, the reservation is successful.

8. The method according to claim 1, further comprising:
sending, by the source device, a notification comprising the determined second minimum value to the destination device through the transfer device, wherein the first data rate parameter of the destination device or the transfer device is set according to the determined second minimum value.

9. The method according to claim 1, wherein before receiving, by the source device, a message sent from the destination device through the transfer device, the method further comprises:
receiving, by the transfer device, the message sent from the destination device, wherein the message comprises the initial value of the first data rate parameter of the destination device;
if the first value of the first data rate parameter of the transfer device is smaller than the initial value of the first data rate parameter in the message, modifying the message by replacing the initial value of the first data rate parameter with the first value of the first data rate parameter of the transfer device;
sending, by the transfer device, the modified message to the source device.

10. The method according to claim 1, wherein, the determining, by a source device, the first value of the first data rate parameter of the source device comprises:
inquiring, by the source device, the first value of the first data rate parameter of the source device from a stored neighbor table or in real time from the at least one neighboring device of the source device;
judging, by the source device, whether a reservation according to the resource reservation request is successful according to the inquired first value of the first data rate parameter of the source device and a desired value of the first data rate parameter determined by the source device,
and wherein, if the reservation is successful, the desired value of the first data rate parameter is taken as the first value of the first data rate parameter of the source device.

11. The method according to claim 10, wherein the desired value of the first data rate parameter is determined according to a performance requirement of data to be transmitted or number of hops between the source device and the destination device.

12. The communications system according to claim 6, wherein the first or the second data rate parameter of each of the source, transfer and destination device comprises:

a total segmentation transmission time divided by a total transmission time; or an expression with an average delay parameter, a maximum delay parameter, a bandwidth requirement parameter, or a segmentation interval parameter as an exclusive independent variable.

13. The communications system according to claim 6, wherein the source device is further configured to inquire the first value of the second data rate parameter of the at least one neighboring device of the source device from a stored neighbor table or in real time from the at least one neighboring device of the source device and judge whether the reservation is successful according to the inquired first value of the second data rate parameter of the at least one neighboring device of the source device and a desired value of the first data rate parameter determined by the source device, and wherein, if the reservation is successful, the desired value of the first data rate parameter is taken as the first value of the first data rate parameter of the source device.

14. The communications system according to claim 13, wherein the source device is further configured to judge whether a summation of the inquired first value of the second data rate parameter of the at least one neighboring device of the source device and the desired value of the first data rate parameter is greater than a preset constant, wherein if the summation is not greater than the preset constant, the reservation is successful.

15. The communications system according to claim 6, wherein the source device is further configured to, after data has been transmitted from the source device, restore the first data rate parameter of the source device to a value prior to the setting of the first data rate parameter of the source device.

16. The communications system according to claim 6, wherein the source device is further configured to send a notification comprising the determined second minimum value to the destination device through the transfer device, wherein the first data rate parameter of the destination device or the transfer device is set according to the determined second minimum value.

17. A source device for adjusting a data rate in a communication network, comprising:
   a processor, configured to determine a first value of a first data rate parameter of the source device according to a first value of a second data rate parameter of at least one neighboring device of the source device;
   a transmitter, configured to send a first resource reservation request to a destination device through a transfer device, enabling the transfer device to determine a first value of the first data rate parameter of the transfer device according to a first value of the second data rate parameter of at least one neighboring device of the transfer device;
   a receiver, configured to receive a message sent from the destination device through the transfer device after the first resource reservation request being received by the destination device, wherein the message comprises a first minimum value which is a smaller one of the first value of the first data rate parameter of the transfer device and a initial value of the first data rate parameter of the destination device;
   and wherein the processor is further configured to determine a second minimum value which is a smaller one of the first value of the first data rate parameter of the source device and the first minimum value; and set the first data rate parameter of the source device according to the second minimum value, so as to control a data rate of the source device.

* * * * *